United States Patent [19]

Nagano et al.

[11] Patent Number: 4,798,758

[45] Date of Patent: Jan. 17, 1989

[54] FOAM GLASS HAVING CRUST LAYER AND METHOD OF PRODUCING SAME

[75] Inventors: Makoto Nagano; Akira Nakanishi, both of Takaishi; Tomoyoshi Hiraki, Osaka; Akira Ueno, Takaishi; Shoji Takahashi, Matsusaka; Shuhei Kobayashi, Tsu; Akihiro Yamamoto, Matsusaka; Fumio Kodama, Ichikawa, all of Japan

[73] Assignee: Central Glass Company, Limited, Ube, Japan

[21] Appl. No.: 23,854

[22] Filed: Mar. 9, 1987

[30] Foreign Application Priority Data

Mar. 10, 1986 [JP] Japan ................................ 61-50302
Mar. 11, 1986 [JP] Japan ................................ 61-51536
Mar. 20, 1986 [JP] Japan ................................ 61-60960

[51] Int. Cl.$^4$ .......................... B32B 3/26; B32B 9/00; B32B 18/00
[52] U.S. Cl. ................................. 428/213; 428/215; 428/218; 428/309.9; 428/312.6; 428/318.6; 428/318.8; 428/319.1; 428/699; 428/701
[58] Field of Search ............... 428/304.4, 309.9, 310.5, 428/312.6, 318.6, 318.8, 319.1, 406, 699, 700, 701, 702, 213, 215, 216, 218

[56] References Cited

U.S. PATENT DOCUMENTS

| | | | |
|---|---|---|---|
| 2,227,770 | 1/1941 | Ungewiss | 428/309.9 |
| 2,301,062 | 11/1942 | Long | 428/312.6 |
| 3,330,627 | 7/1967 | McCormick et al. | 428/312.6 |
| 3,546,061 | 12/1970 | Kraemer et al. | 428/312.6 |
| 3,974,315 | 8/1976 | Murata | 428/310.5 |

FOREIGN PATENT DOCUMENTS

| | | | |
|---|---|---|---|
| 50-26145 | 3/1975 | Japan . | |
| 50-123108 | 9/1975 | Japan . | |
| 51-77610 | 7/1976 | Japan . | |
| 58-190828 | 11/1983 | Japan | 428/312.6 |
| 60-166239 | 8/1985 | Japan | 428/312.6 |
| 510839 | 8/1939 | United Kingdom . | |
| 1055908 | 1/1967 | United Kingdom . | |
| 1552663 | 9/1979 | United Kingdom . | |

*Primary Examiner*—William J. Van Balen
*Attorney, Agent, or Firm*—Fleit, Jacobson, Cohn & Price

[57] ABSTRACT

The invention relates to a foam glass having a foam layer and a crust layer which covers at least one major surface of the foam layer. The crust layer is formed so as to have a thickness of from 1.5 to 20 mm and an apparent specific gravity of from 0.8 to 1.7, whereas the foam layer has an apparent specific gravity of from 0.3 to 0.6. The powder materials of the foam layer and the crust layer are respectively granulated prior to firing operation. This foam glass has good impact resistance, flexural strength and machinability including cuttability. By dispersing 15–30 vol % of glass grains 0.5–5.2 mm in diameter in the crust layer the foam glass is improved in surface hardness and flaw resistance. When the foam glass is reinforced by embedding therein a metal material such as wire netting, the metal material is pretreated with either a mixture of a silica based glass powder and an adhesive liquid binder or a dispersion of a silicon alkoxide optionally together with another metal alkoxide in a liquid medium to ensure firm adhesion of the metal material to the glass matrix and enhance mechanical strength and fire resistance of the foam glass.

20 Claims, 2 Drawing Sheets

FOAM GLASS HAVING CRUST LAYER AND METHOD OF PRODUCING SAME

BACKGROUND OF THE INVENTION

This invention relates to a foam glass having a crust layer on at least one side of a foam layer and is particularly concerned with improvements in the mechanical properties of the crust layer. The foam glass is of use mainly as an interior or exterior decorative material in buildings or even as an outer wall material and may be a reinforced foam glass using a metal netting or an alternative.

In the art of foam glass it is known to provide a crust layer on a major surface of a foam layer, i.e. foamed glass layer, with a view to protecting the foam layer and enhancing the tensile and flexural strength of the foam glass. For example, JP-A No. 50-123108 shows a foam glass having a vitreous crust layer of a very dense structure, which is formed by firing a mixture of glass particles and a fine powder of glass. JP-A No. 60-166239 shows a laminated foam glass having a foam layer whose porosity is 1-30 vol %. The crust layer is formed by firing a mixture of a major amount of a fine powder of glass and a minor amount of a coarsely granulated glass base material. This crust layer is considerably high in apparent specific gravity, viz. at least about 1.75 while the true specific gravity of glass is about 2.5.

The provision of a crust layer of a dense structure enhances rigidity of the foam glass but raises problems in different aspects. First, the dense crust layer lacks machinability so that cutting of the foam glass becomes almost impracticable unless the crust layer is omitted along planned cutting lines at the foam glass manufacturing stage. Even when cutting of the crusted foam glass is barely possible it is often that cracks propagate long from the cutting lines so that a considerable portion of the product becomes unacceptable. In another aspect, when the dense crust layer is externally and locally impacted resultant cracks are liable to propagate in many directions and sometimes cause collapse of the whole foam glass. On the other hand, if the crust layer is thoughtlessly made low in apparent specific gravity (hereinafter the term "bulk density" will be used in this sense) the surface hardness may not be sufficient so that the crust layer may be damaged relatively easily with, for example, a knife edge. Besides, formation of the crust layers of the prior art using a fine powder of glass is liable to suffer from locally insufficient fusion bonding of the crust layer to the foam layer and/or existence of unwanted voids in the crust layer. Such deficiencies will cause lowering of the strength of the foam glass as a whole.

SUMMARY OF THE INVENTION

It is an object of the present invention to provide an improved foam glass having a crust layer which is good in impact resistance, flexural strength and surface hardness and is cuttable with a machine tool.

It is another object of the invention to provide a method of producing a foam glass according to the invention.

Also it is an object of the invention to provide a reinforced foam glass which has a crust layer improved in the aforementioned properties and in which the reinforcing metal material is strongly adhearing to the glass matrix of the foam layer and/or the crust layer.

It is still another object of the injection to provide a method of producing a reinforced foam glass according to the invention.

According to the invention, there is provided a foam glass comprising a foam layer and a crust layer which is unitary with the foam layer and covers at least one side of the foam layer, the crust layer having a bulk density in the range from 0.8 to 1.7 and a thickness in the range from 1.5 to 20 mm.

In this foam glass it is preferred that the bulk density of the foam layer is in the range from 0.3 to 0.6.

Besides, this invention provides a method of producing a foam glass according to the invention, the method being characterized in that the foam layer is formed by firing a granulated material comprising a glass powder, as the principal material, and a foaming agent and that the crust layer is formed by firing another granulated material comprising a glass powder as the principal material.

A foam glass according to the invention having the above features possesses high flexural strength comparable to that of aerated lightweight concrete (ALC) and is excellent in impact resistance and heat insulating capability and, as a further advantage, is cuttable with a machine tool. Accordingly this foam glass is very suitable for use as an interior or exterior decorative material in buildings or as an outer wall material.

A foam glass according to the invention can be further improved in surface hardness and flaw resistance by mixing glass grains with the aforementioned granulated material of the crust layer such that the crust layer comprises 15-30 vol % of glass grains which are 0.5 to 5.2 mm in grain size and are dispersed in the glass matrix of the crust layer.

When the present invention is embodied in a reinforced foam glass comprising a reinforcing metal material, such as wire netting, embedded in at least one of the foam layer and the crust layer, we recommend to coat the metal material with a gluing agent comprising a silica based glass or a source material thereof prior to disposition of the metal material in a layer of the granulated material of the foam layer or the crust layer.

DETAILED DESCRIPTION OF THE INVENTION

In a foam glass according to the invention the material of the foam layer is, in essence, a fine powder of an ordinary glass such as, for example, soda lime glass, borosilicate glass or aluminosilicate glass. The glass may be either colored or colorless. The true specific gravity of the glass powder is about 2.5, and usually the particle size of the glass powder is not larger than 150 $\mu$m. Optinally inorganic pigment may be added to the glass powder. The glass powder is mixed with a conventional foaming agent in powder form, such as limestone or calcium carbonate, dolomite or carbon. In the present invention the powder mixture is wetted with a suitable binder such as water glass and granulated by a suitable method into granules which are from about 0.1 mm to several millimeters in diameter.

The powder mixture of glass and foaming agent is very bulky and contains a large amount of air. When this powder mixture is fired, without being granulated, in the foaming operation a portion of the occluded air remains in the melted glass and expands. This becomes a cause of shortcomings such as development of undesirably coarse bubbles and voids, undulating of the interface between the foam layer and the crust layer and local protrusion of the foam layer into the crust layer to reach the outer surface of the foam glass in some cases. Such disadvantages are obviated by granulating the powder mixture since occlusion of air is reduced. Furthermore, the foam layer formed by using the granulated material is remarkably low in water absorption and water permeation because in this case most of the foams become closed cells, whereas the use of the ungranulated powder mixture is liable to give open or interconnecting cells. Besides, the granulated material exhibits good fluidity and accordingly is convenient for pouring into a molding box or the like at the subsequent stage of the manufacturing process and readily gives a flat layer.

The material of the crust layer is, in essence, a fine powder of an ordinary glass similar to the glass powder used as the principal material of the foam layer. Optionally inorganic pigment and/or foaming agent may be added to the glass powder. The powder material is granulated by using a suitable binder into 9ranules which are from about 0.1 mm to several millimeters in diameter. The granulation of the material reduces the amount of occluded air and leads to a success in forming a uniformly healthy crust layer without suffering from local defects or weak points.

Mainly for the purpose of enhancing the hardness and flaw resistance of the crust layer, it is preferred to disperse glass grains in the glass matrix of the crust layr by mixing the granulated material of the crust layer with glass grains 0.5–5.2 mm in diameter such that the glass grains occupy 15–30 vol % of the crust layer. The details of this matter will be described later. The glass grains may nt be uniform in diameter and may be colored uniformly or irregularly with a view to giving an elegant appearance to the foam glass.

The firing of the granulated materials can be accomplished by any of known methods for producing foam glass having a crust layer. For example, first the granulated material of the foam layer is put into a molding box of steel so as to provide a bed having a predetermined thickness, and then the granulated material of the crust layer is accumulated on the aforementioned bed so as to provide an upper layer having a predetermined thickness. Then the materials in the molding box are heated in a furnance at a suitable temperature, which is usually in the range from 700° to 1000° C., to cause fusion of the glass powders and foaming of the glass in the lower layer. To control the thickness and bulk density of the foam glass and also to ensure tight adhesion of the crust layer to the foam layer, a pressure of suitable magnitude may be applied to the layered materials either during the firing operation or immediately after completion of firing. Alternatively, the foam layer and the crust layer are formed separately each by a firing operation analogous to the above described operation, and subsequently the two layers are placed one upon another and subjected to heating for accomplishment of fusion bonding of the two layers with each other to thereby obtain a unitarily crusted foam glass plate.

The foam glass can be produced continuously and probably more economically by using, for example, a pair of vertically spaced conveyer belts made of a heat resistant material to continuously introduce the granulated material of the foam layer into a lower section of a furnance in which firing and foaming are accomplished and the granulated material of the crust layer into an upper section of the same furnance.

It is preferable that the bulk density of the foam layer falls in the range from 0.3 to 0.6. When the bulk density of the foam layer is below 0.3 the foam glass will be insufficient in strength for use as an interior or exterior material in buildings. However, when the bulk density of the same layer exceeds 0.6 the foam glass will be degraded in heat insulating capability, lightweightness and workability.

The bulk density of the crust layer is limited within the range from 0.8 to 1.7. If the bulk density of the crust layer is below 0.8 the crust layer is insufficient in denseness of its structure so that the foam glass is insufficient in strength, particularly in flexural strength, and resistance to external shock or impact. On the other hand, if the bulk density of the crust layer exceeds 1.7 this layer becomes too brittle, though rigidity of the foam glass is enhanced, so that an external and local impact on this layer is liable to result in propagation of cracks from the point of impact and, in an extreme case, collapse of the whole foam glass. Futhermore, when the bulk density of the crust layer is above 1.7 the foam glass is inferior in machinability, so that cutting of a plate of the foam glass into several pieces will possibly produce cracks which propagate from the cutting lines or nearby points in unpredictable directions. To use the foam glass as an exterior material in buildings or as an outer wall material it is necessary that the impact resistance (P) of the foam glass be at least 1.0 kgf.m, and preferably 1.3 kgf.m or above. When the bulk density of the crust layer is within the above specified range the foam glass has an impact resistance higher than 1.3 kgf.m.

In determining the bulk densities of the foam layer and the crust layer care should be taken not to produce a very large difference between the bulk densities of the respective layers. If the difference in bulk density is too large it is difficult to accomplish uniform annealing of the foam glass, so that strains are produced at the interface between the two layers and will become a cause of cracking at the interface when external force such as bending force or impulsive force acts on the foam glass. It is desirable that the difference in bulk density is not more than 1.2. The bulk densities of the respective layers can be desirably controlled by selection of the material conditions such as the softening temperature of the glass as the principal material, the kind and amount of the foaming agent and the kind and amount of an optionally added inorganic pigment and the firing conditions.

It is suitable that the total thickness of the foam glass is in the range from about 30 mm to about 125 mm. When the total thickness is less than 30 mm the foam glass is insufficient in heat insulating capability, but it is unnecessary to increase the thickness beyond about 125 mm insofar as heat insulation in ordinary buildings is concerned. When the thickness is further increased the foam glass becomes considerably heavy in contrast to the current trend toward lightweight and high rise buildings, and heaviness offers inconvenience to handling and construction working. The thickness of the crust-layer is limited within the range from 1.5 to 20 mm so that the foam glass may possess good heat insulating property and may not become too heavy.

It is preferable that the thickness of the crust layer is not more than ¼ of the whole thickness of the foam glass. An optimum thickness of the crust layer depends on the bulk density of the same layer too. For example, in the case of a crust layer having a bulk density of 1.2 the impact resistance of the foam glass becomes satisfactory by affording a thickness of about 4 mm to the crust layer. When the bulk density of the crust layer is below 1.2 it is favorable for the impact resistance to increase the thickness of the same layer and when the bulk density is above 1.2 to decrease the thickness. In general the impact resistance (P) of the foam glass can be made 1.3 kgf.m or above by apropriately determining the thickness of the crust layer within the range of 1.5–20 mm. In another aspect, when the thickness of the crust layer is not more than 20 mm the foam glass exhibits good machinability so that cutting of a plate of the foam glass can be accomplished without producing breaking or cracking. It is preferred to determine the thickness of the crust layer within the range from 2 to 9 mm.

A foam glass produced with consideration of the above described points is far better tan ALC of the same bulk density not only in resistance to water absorption and water permeation but also in flexural strength and compressive strength and possesses good impact resistance and machinability. Therefore, this foam glass is fully practicable as an interior or exterior material in buildings and even as an outer wall material.

This invention can be embodied in a reinforced foam glass in which either or both of the foam layer and the crust layer is reinforced with a metal material represented by wires, wire netting and panting metal. The metal material can be embedded in the foam glass by a known technique. For example, the metal material is disposed in the molding box for firing and foaming of the granulated glass materials in advance of pouring the glass materials. In the case of a continuous manufacturing process using a pair of vertically spaced conveyer belts to introduce the material of the foam layer and the material of the crust layer into a furnance, the metal material is continuously fed into the furnace by passing it through the space between the two conveyer belts. A reinforced foam glass according to the invention can be used as an outer wall material or as a floor material. The details of the reinforcement will be described later.

Usually it suffices to cover only one side of the foam layer with a crust layer according to the invention, but it is optional to cover the opposite side of the foam layer also with a similar crust layer. This is easily accomplished by modifying the batchwise or continuous manufacturing method described hereinbefore so as to introduce the material of the crust layer into the bottom section and top section of the firing euipment and the material of the foam layer into the middle section of the same equipment. The resultant foam glass is of a unitarily three-layered construction and is particularly suitable as an outer wall material.

As a further modifiction, the foam layer may be entirely covered or enclosed with the crust layer. For example, first a three-layered foam glass member having crust layers on the opposite major surfaces of the foam layer is produced by the above described method. Next, two opposite side faces of this foam glass member are covered with crust layers by the steps of preparing a bed of the granulated material of the crust layer in a molding box, setting the foam glass member a side face upside on the bed, layering the granulated material of the crust layer on the foam glass member and firing the materials in the molding box to accomplish fuse bonding of crust layers to the provisionally top and bottom faces of the foam glass member. Then the other two opposite side faces of the foam glass member are covered with crust layers by the same operation. In the case of a continuous manufacturing method using a pair of vertically spaced conveyer belts to feed the granulated materials to the firing equipment, a three layered foam glass member is carried an uncovered side face upside in the space between the two conveyer belts, and both of the two conveyer belts are used to feed the granulated material of the crust layer to the firing equipment. After covering the two opposite side faces of the foam glass member with crust layers, the same operation is repeated to cover the remaining two side faces of the foam glass member with crust layers. The entirely crusted foam glass is very strong and rigid.

In any type of foam glass according to the invention, at least one major outer surface may optionally be undulated or engraved so as to provide a number of recessed areas and remaining land areas. The mentioned outer surface may be of either the foam layer or the crust layer. When the foam glass is cemented as an exterior material to a wall surface the undulation or engraving serve the purpose of enlarging the bonding area. From a different point of view, the engraving produces an aesthetically favorable effect when the recesses and lands are arranged in a suitable geometrical pattern and the engraved surface is used as the external surface. Such undulating or patterned engraving can easily be accomplished by using a molding box in which the bottom face is formed with undulations or a number of suitably shaped projections, by using a press platen formed with undulations or a number of projections, or by using a meshed conveyer belt in a continuous manufacturing method.

EXAMPLE 1

As the principal material of the foam layer, cullet of ordinary soda lime glass was pulverized to a fine powder not larger than 150 μm in particle size, and the glass powder was mixed with 0.7 wt % of calcium carbonte powder used as a foaming agent. A small amount of water glass, as a binder, was added to the powder mixture, and the resultant mixture was kneaded and granulated by a tumbling granulation method into grains 0.5–2 mm in diameter.

The principal material of the crust layer was the aforementioned soda lime glass powder. The glass powder was mixed with 1 wt % of ferric oxide powder as a coloring agent and a small and variable amount of calcium carbonte powder which was used to control the bulk density of the crust layer. A small amount of water glass was added to the powder mixture, and the resultant mixture was kneaded and granulated by tumbling granulation into grains 0.5–2 mm in diameter.

The granulated material of the foam layer was poured into a steel molding box so as to accumulate to a predetermined thickness, and then the granulated material of the crust layer was poured into the molding box and layered to a predetermined thickness on the firstly accumulated granular material. In that state the materials in the molding box were fired in a furnance at 750°–1000°

C. for 20-60 min, followed by annealing. According to the need for the control of thicknesses and/or bulk densities, pressure was applied to the materials under firing or immediately after firing. The foam glass obtained by this process had a crust layer only on one side of the foam layer.

As shown in Tables 1 and 2 a number of samples were produced with variations in bulk densities and thicknesses of the respective layers. The bulk density of the foam layer was either 0.4 or 0.5, and the total thickness of the foam glass was either 50 mm or 100 mm. The bulk density of the crust layer was varied within the range from 0.6 to 2.0, meaning that some samples were not in accordance with the invention in this point. The thickness of the crust layer was varied within the range from 1 to 30 mm, meaning that some samples were not in accordance with the invention in this point. The thickness of the foam layer was also varied as the total thickness of the foam glass had to become 50 mm or 100 mm.

The following tests were made on these samples of foam glass.

Flexural Strength Test

Figure 1:
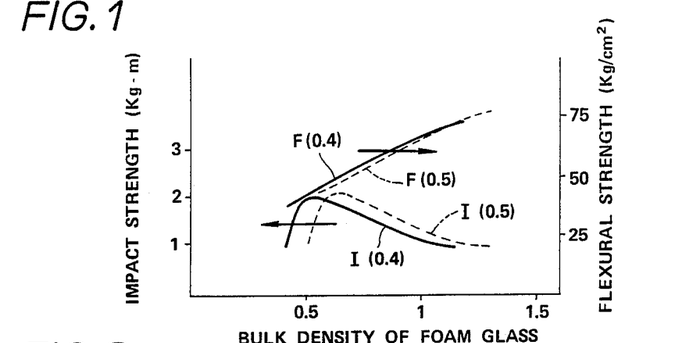
FIGS. 1 to 3 are graphs showing the results of experiments on the dependence of the impact resistance and flexural strength of a foam glass according to the invention on the bulk density of the foam glass, thickness of the crust layer and bulk density of the crust layer.
Figure 2:
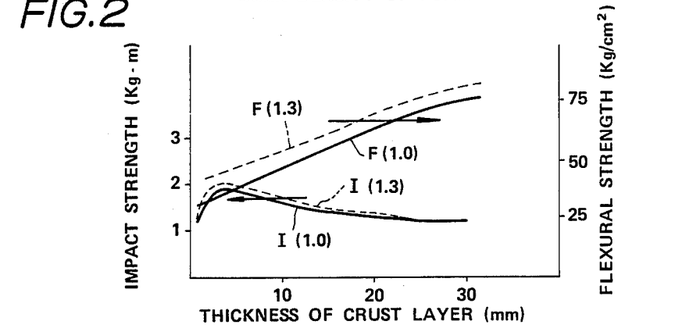
Figure 3:
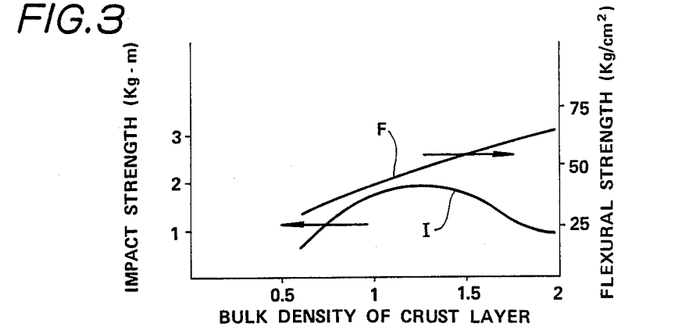

The 50 mm thick samples of foam glass were cut into test pieces 15 cm in width, 20 cm in length and 50 mm in thickness. Each test piece was supported at two points with a span of 15 cm. The crust layer was on the supporting side. A variable bending load was applied at one point at a rate of 1 mm/min to measure flexural break strength. The results are shown in FIGS. 1-3 by curves indicated by character F. In FIG. 1 the parenthesized figures indicate the bulk density of the foam layer, and in FIG. 2 the parenthesized figures indicte the bulk density of the crust Layer.

Impact Resistance Test

Test pieces of foam glass for this test were 40 cm in width, 40 cm in length and 50 mm or 100 mm in thickness. On a sand bed each test piece was laid its crust layer upside, and a steel ball weighing 1 kg was dropped onto the test piece from a variable height to find break strength of the sample foam glass. The results are shown in FIGS. 1-3 by curves indicted by character I. The meaning of the parenthesized figures is as noted above. In Tables 1-A, 1-B, 2-A and 2-B the impact resistance of the samples is evaluated in three grades on the basis of the measured impact break strength, P (kgf.m). The grade A means "excellent" (P>1.7). The grade B means "good" ($1.3 \leq P < 1.7$). The grade C means "inferior" (P<1.3).

Cuttability Test

Test pieces of foam glass for this test were 40 cm in width, 40 cm in length and 50 mm or 100 mm in thickness. Each test piece was cut into two halves with a resinoid grinding wheel using corundum as the abrasive grains, and the degrees of local breaking and cracking of the foam glass samples were examined to evaluate cuttability in four grades as shown in the Tables. The grade A means "excellent" (no cracking and little breaking). The grade B means "good" (no cracking and minute breaking, but no problem in appearance). The grade C means "rather inferior" (appreciable breaking and sometimes cracking). The grade D means "inferior" (frequently cracking).

Heat Insulation Test

Selected samples of the foam glass were cut into square prisms 30 mm×30 mm in cross section and 50 mm in length in the cases of the 50 mm thick samples, and 100 mm in length in the cases of the 100 mm thick samples. Heat conductivity, $\lambda$(kcal/m hr °C.), of each test piece in the lengthwise direction (i.e. in the direction thicknesswise of the foam glass) at 50° C. on an average was measured by a regular method. In the Tables heat insulating capabilities of the foam glass samples are evaluated in three stages on the basis of the measured heat conductivity. The grade A means "excellent" ($\lambda \leq =0.12$). The grade B means "good" ($0.12 < \lambda \leq 0.16$). The grade C means "inferior" ($\lambda > 0.16$).

TABLE 1-A

| Foam Layer | | Crust Layer | | | | |
|---|---|---|---|---|---|---|
| Bulk Density | Thickness (mm) | Bulk Density | Thickness (mm) | Cutta-bility | Heat Insulation | Impact Resistance |
| 0.4 | 49 | 0.6 | 1 | A | A | C |
| 0.4 | 48 | 0.6 | 2 | A | A | C |
| 0.4 | 37.5 | 0.6 | 12.5 | A | | C |
| 0.4 | 35 | 0.6 | 15 | A | A | C |
| 0.4 | 49 | 0.8 | 1 | A | | C |
| 0.4 | 48 | 0.8 | 2 | A | A | A |
| 0.4 | 37.5 | 0.8 | 12.5 | A | A | B |
| 0.4 | 30 | 0.8 | 20 | A | C | B |
| 0.4 | 42.5 | 1.1 | 7.5 | A | | B |
| 0.4 | 35 | 1.1 | 15 | A | B | B |
| 0.4 | 42.5 | 1.5 | 7.5 | A | | A |
| 0.4 | 37.5 | 1.5 | 12.5 | A | B | B |
| 0.4 | 35 | 1.5 | 15 | B | C | B |
| 0.4 | 49 | 1.7 | 1 | A | | C |
| 0.4 | 42.5 | 1.7 | 7.5 | A | A | A |
| 0.4 | 37.5 | 1.7 | 12.5 | B | B | B |
| 0.4 | 35 | 1.7 | 15 | B | C | B |
| 0.4 | 30 | 1.7 | 20 | B | C | B |
| 0.4 | 49 | 2.0 | 1 | B | | C |
| 0.4 | 42.5 | 2.0 | 7.5 | C | | C |
| 0.4 | 37.5 | 2.0 | 12.5 | C | C | C |
| 0.4 | 35 | 2.0 | 15 | C | C | C |
| 0.4 | 30 | 2.0 | 20 | C | | C |

TABLE I-B

| Foam Layer | | Crust Layer | | | | |
|---|---|---|---|---|---|---|
| Bulk Density | Thickness (mm) | Bulk Density | Thickness (mm) | Cutta-bility | Heat Insulation | Impact Resistance |
| 0.5 | 49 | 0.6 | 1 | A | | C |
| 0.5 | 37.5 | 0.6 | 12.5 | A | A | C |
| 0.5 | 35 | 0.6 | 15 | A | | C |
| 0.5 | 48 | 0.8 | 2 | A | A | A |
| 0.5 | 37.5 | 0.8 | 12.5 | A | A | B |
| 0.5 | 30 | 0.8 | 10 | A | C | B |
| 0.5 | 45 | 1.5 | 5 | A | | A |
| 0.5 | 37.5 | 1.5 | 12.5 | A | B | B |
| 0.5 | 35 | 1.5 | 15 | A | C | B |
| 0.5 | 49 | 1.7 | 1 | A | | C |
| 0.5 | 48 | 1.7 | 2 | A | A | A |
| 0.5 | 37.5 | 1.7 | 12.5 | B | B | B |
| 0.5 | 30 | 1.7 | 20 | B | C | B |
| 0.5 | 45 | 2.0 | 5 | C | C | C |
| 0.5 | 37.5 | 2.0 | 12.5 | C | C | C |
| 0.5 | 35 | 2.0 | 15 | C | | C |

TABLE 2-A

| Foam Layer | | Crust Layer | | | | |
|---|---|---|---|---|---|---|
| Bulk Density | Thickness (mm) | Bulk Density | Thickness (mm) | Cutta-bility | Heat Insulation | Impact Resistance |
| 0.4 | 99 | 0.6 | 1 | A | | C |

TABLE 2-A-continued

| Foam Layer | | Crust Layer | | | | |
|---|---|---|---|---|---|---|
| Bulk Density | Thickness (mm) | Bulk Density | Thickness (mm) | Cuttability | Heat Insulation | Impact Resistance |
| 0.4 | 98 | 0.6 | 2 | A | A | C |
| 0.4 | 90 | 0.6 | 10 | A | | C |
| 0.4 | 80 | 0.6 | 20 | A | | C |
| 0.4 | 70 | 0.6 | 30 | A | A | C |
| 0.4 | 99 | 0.8 | 1 | A | | C |
| 0.4 | 98 | 0.8 | 2 | A | A | A |
| 0.4 | 85 | 0.8 | 15 | A | | B |
| 0.4 | 75 | 0.8 | 25 | A | A | C |
| 0.4 | 70 | 0.8 | 30 | B | B | C |
| 0.4 | 90 | 1.1 | 10 | A | A | B |
| 0.4 | 75 | 1.1 | 25 | B | B | C |
| 0.4 | 70 | 1.1 | 30 | B | B | C |
| 0.4 | 90 | 1.5 | 10 | A | A | B |
| 0.4 | 80 | 1.5 | 20 | B | B | B |
| 0.4 | 70 | 1.5 | 30 | C | | C |
| 0.4 | 99 | 1.7 | 1 | A | A | C |
| 0.4 | 98 | 1.7 | 2 | A | | A |
| 0.4 | 85 | 1.7 | 15 | B | A | B |
| 0.4 | 75 | 1.7 | 25 | B | B | C |
| 0.4 | 70 | 1.7 | 30 | C | | C |
| 0.4 | 99 | 2.0 | 1 | B | | C |
| 0.4 | 98 | 2.0 | 2 | B | | A |
| 0.4 | 85 | 2.0 | 15 | C | C | B |
| 0.4 | 75 | 2.0 | 25 | D | C | C |
| 0.4 | 70 | 2.0 | 30 | D | | C |

TABLE 2-B

| Foam Layer | | Crust Layer | | | | |
|---|---|---|---|---|---|---|
| Bulk Density | Thickness (mm) | Bulk Density | Thickness (mm) | Cuttability | Heat Insulation | Impact Resistance |
| 0.5 | 99 | 0.6 | 1 | A | | C |
| 0.5 | 80 | 0.6 | 20 | A | | C |
| 0.5 | 70 | 0.6 | 30 | A | A | C |
| 0.5 | 98 | 0.8 | 2 | A | | A |
| 0.5 | 75 | 0.8 | 25 | A | B | B |
| 0.5 | 70 | 0.8 | 30 | B | B | C |
| 0.5 | 90 | 1.5 | 10 | A | | B |
| 0.5 | 75 | 1.5 | 25 | B | B | C |
| 0.5 | 99 | 1.7 | 1 | A | | C |
| 0.5 | 98 | 1.7 | 2 | A | | A |
| 0.5 | 85 | 1.7 | 15 | B | | B |
| 0.5 | 75 | 1.7 | 25 | B | B | C |
| 0.5 | 70 | 1.7 | 30 | C | C | C |
| 0.5 | 95 | 2.0 | 5 | C | | C |
| 0.5 | 75 | 2.0 | 25 | D | C | C |
| 0.5 | 70 | 2.0 | 30 | D | C | C |

With respect to the 50 mm thick foam glass samples, FIG. 1 shows the dependence of th flexural strength and impact resistance on the bulk density of the foam glass as a whole. It is apparent that the flexural strength of the foam glass increases as the bulk density increases. In contact, the impact resistance becomes maximal in a specific range of the bulk density. The bulk density of the foam glass as a whole is equal to [(thickness of the crust layer)×(difference in specific gravity between the crust layer and the foam layer)/(total thickness)]+(bulk density of the foam layer). Therefore, when the total thickness (50 mm) and the bulk density of the foam layer (e.g. 0.4) are constant the bulk density of the foam glass is proportional to [(thickness of the crust layer)×(difference in specific gravity between the crust layer and the foam layer)]. That is, the impact resistance of the foam glass becomes maximal in a specific range of [(thickness of the crust layer)×(difference in specific gravity between the crust layer and the foam layer)]. Roughly speaking, the foam glass exhibits good impact resistance when the crust layer is relatively low in bulk density and has a relatively large thickness and also when the crust layer is relatively high in bulk density and is relatively thin.

With respect to the 50 mm thick foam glass samples FIG. 2 indicates that, when the bulk density of the foam layer (0.4) and the bulk density of the crust layer (1.0 or 1.3) are constant, the flexural strength of the foam glass increases as the thickness of the crust layer increases and that the impact resistance becomes maximal in a specific range of the thickness of the crust layer.

With respect to the 50 mm thick foam glass samples FIG. 3 indicates that, when the bulk density of the foam layer (0.4) and the thickness of the crust layer (5 mm) are constant, the flexural strength of the foam glass increases as the bulk density of the foam layer increases and that the impact resistance becomes maximal in a specific range of the bulk density of the crust layer.

Collectively, FIGS. 1–3 indicate that the foam glass exhibits high impact resistance as well as good flexural strength when the crust layer has a bulk density of 0.8–1.7 and a thickness of 1.5–20 mm.

As can be seen in Tables 1-A and 1-B, the 50 mm thick foam glass was satisfactory in both cuttability and heat insulating capability when the crust layer was not more than 1.7 in bulk density and not more than 12.5 mm in thickness, i.e. not more than ¼ of the total thickness of the foam glass. In Tables 2-A and 2-B it is seen that the 100 mm thick foam glass was satisfactory in both cuttability and heat insulating capability when the crust layer was not more than 1.7 in bulk density and not more than 25 mm in thickness, i.e. not more than ¼ of the total thickness of the foam glass. As to the impact resistance, the Tables indicate that if the crust layer is as low as 0.6 or as high as 2.0 in bulk density and is as thin as 1 mm or thicker than 20 mm satisfaction cannot be obtained irrespective of the thickness of the foam layer or of the foam glass as a whole and that satisfaction can be obtained by controlling the bulk density of the crust layer within the range from 0.8 to 1.7 and the thickness of the same layer within the range from 2 to 20 mm.

Thus, the above described test results are collectively demonstrative of appropriateness of the limitations according to the invention on the bulk density and thickness of the crust layer and, besides, indicate that preferably the thickness of the crust layer should be not more than ¼ of the total thickness of the foam glass.

As mentioned hereinbefore, the surface hardness and flaw resistance of the crust layer can be enhanced by dispersing glass grains in the glass matrix which may optionally contain an inorganic pigment. Of course the glass grains are fuse bonded to the glass matrix. In producing a foam glass of this type, glass grains not smaller than 0.5 mm and not larger than 5.2 mm in grain size are mixed with the granulated fundamental material of the crust layer. If glass grains larger than 5.2 mm are used, cutting of the obtained foam glass is liable to produce cracks along the dispersed glass grain boundaries. Use of glass grains smaller than 0.5 mm is not effective in enhancing the surface hardness of the crust layer. However, it is permissible that a small amount of glass grains or glass powder smaller than 0.5 mm in grain size exists together with desired 0.5–5.2 mm glass grains. The glass grains may not be uniform in grain size within the range of 0.5–5.2 mm, and it is optional to differentiate the grain size and/or color of the glass grains with the intention of producing a foam glass having an elegant appearance.

The amount of the glass grains added to the granulatd material should be such that the glass grains occupy 15-30 vol % of the crust layer in the obtained foam glass. Although the surface hardness and flaw resistance of the crust layer become higher as the amount of the dispersed glass grains is increased, machinability of the foam glass becomes inferior when the crust layer contains more than 30 vol % of glass grains. In a practical sense, the flaw resistance of the crust layer can be represented by resistance to penetration of a steel rod thrusted under a variable load against the crust layer. For reference, the penetration resistance (R) of ALC having a bulk density of 0.6 is as low as 30–40 kg/cm$^2$, and such ALC is easily damaged with a knife edge or the like because of low surface hardness. To enhance the surface hardness to such extent that the surface is hardly damaged by forcible contact with a knife edge, the penetration resistance of the material has to be enhanced to at least 120 kg/cm$^2$. In the case of the foam glass according to the invention the penetration resistance reaches such a level when the glass grains occupy at least 15 vol % of the crust layer.

EXAMPLE 2

The granulated material of the foam layer in Example 1 was used in this example too.

The material of the crust layer was a mixture of glass grains and the granulated material of crust layer used in Example 1. As can be seen in Tables 3-A and 3-B and FIGS. 4–6 several kinds of glass grains different in grain size within the range from 0.1 to 6.7 mm were selectively used, and the proportion of the glass grains to the granulated material was varied so as to vary the content of the glass grains in the crust layer in the range from 0 to 50 vol %.

Using these materials, a firing operation was carried out substantially in the same manner as in Example 1. The foam glass obtained by this process had a crust layer only on one side of the foam layer, and the crust layer contained glass grains dispersed in the glass matrix was colored with ferric oxide.

A number of samples were produced with variations in the particulars of the crust layer, but the bulk density of the foam layer was always 0.4 and the total thickness of foam glass was either 50 mm or 100 mm. The bulk density of the crust layer was varied within the range from 0.9 to 1.6 and the thickness within the range from 2 to 20 mm.

The cuttability test described in Example 1 and the below described penetration test were made on these samples of foam glass.

Steel Rod Penetration Test

Test pieces of foam glass for this test were 15 cm in width, 15 cm in length and 50 mm or 100 mm in thickness. Each test piece was held its crust layer upside, and a steel rod having a diameter of 4 mm was thrusted under a variable load against the test piece from the upside at a rate of 5 mm/min. The penetration resistance of the test piece was represented by the load up to which the test piece resisted against penetration.

Figure 4:
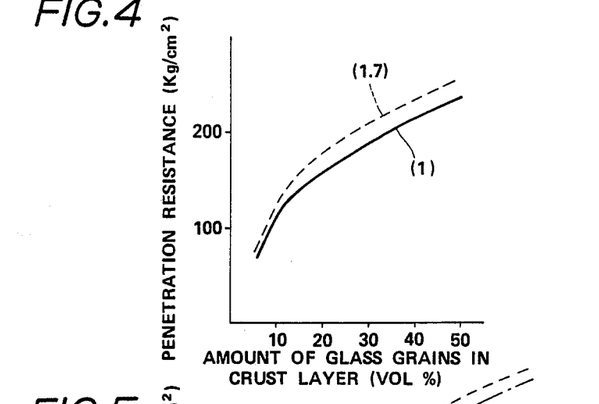
FIGS. 4 to 6 are graphs showing the results of experiments on the dependence of the penetration resistance of a foam glass according to the invention on the content and grain size of glass grains dispersed in the crust layer.
Figure 5:
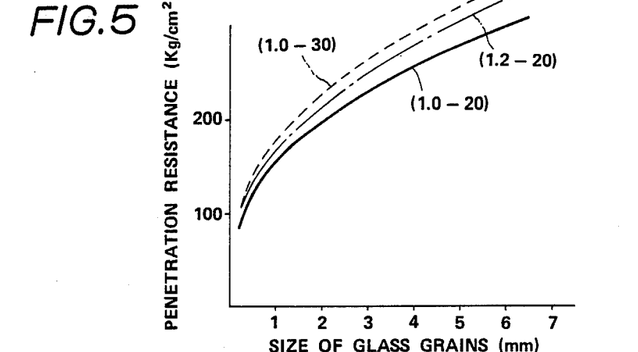
Figure 6:
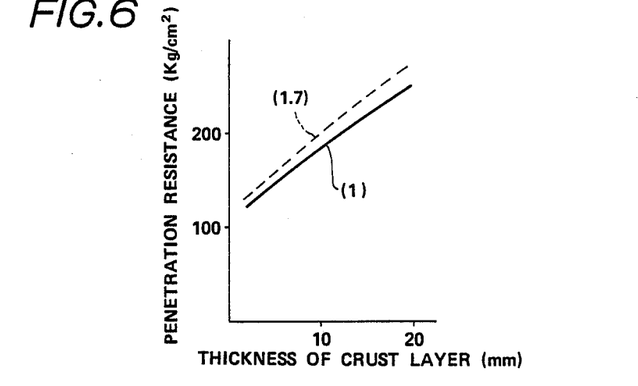

The results of this test are shown in FIGS. 4–6. In Tables 3A and 3-B the penetration resistance of the samples is evaluated in three grades on the basis of the penetration resistance measurement in terms of load, R (kg/cm$^2$). The grade A means "excellent" (R>200). The grade B means "good" ($120 \leq R < 200$). The grade C means "unsatisfactory" (R<120). As to the evaluation of cuttability in Tables 3-A and 3-B, the grades A, B and C are in the same sense as in Tables 1 and 2.

TABLE 3-A

| Foam Layer (bulk density 0.4) Thickness (mm) | Crust Layer Bulk Density | Thickness (mm) | Glass Grains Grain Size (mm) | Glass Grains Amount (vol %) | Penetration Resistance | Cuttability |
|---|---|---|---|---|---|---|
| 48 | 0.6 | 2 | 0.5 | 15 | C | A |
| | | | 0.5 | 30 | C | A |
| | | | 5.2 | 15 | C | A |
| | | | 5.2 | 30 | C | B |
| 38 | 0.6 | 12 | 0.5 | 15 | C | A |
| | | | 0.5 | 30 | C | B |
| 48 | 0.8 | 2 | 0.2 | 10 | C | A |
| | | | 0.2 | 30 | C | A |
| | | | 0.5 | 10 | C | A |
| | | | 0.5 | 15 | B | A |
| | | | 0.5 | 30 | B | B |
| | | | 0.5 | 50 | B | C |
| | | | 5.2 | 5 | C | A |
| | | | 5.2 | 15 | B | A |
| | | | 5.2 | 30 | B | B |
| | | | 5.2 | 45 | A | C |
| | | | 6.7 | 15 | A | C |
| | | | 6.7 | 30 | A | C |
| 38 | 0.8 | 12 | 0.2 | 10 | C | A |
| | | | 0.2 | 30 | C | A |
| | | | 0.5 | 10 | C | A |
| | | | 0.5 | 15 | B | B |
| | | | 0.5 | 30 | A | B |
| | | | 0.5 | 50 | A | C |
| | | | 5.2 | 5 | C | A |
| | | | 5.2 | 15 | B | B |
| | | | 5.2 | 30 | A | B |
| | | | 5.2 | 45 | A | C |
| | | | 6.7 | 15 | A | C |
| | | | 6.7 | 30 | A | C |

TABLE 3-B

| Foam Layer (bulk density 0.4) Thickness (mm) | Crust Layer Bulk Density | Thickness (mm) | Glass Grains Grain Size (mm) | Glass Grains Amount (vol %) | Penetration Resistance | Cuttability |
|---|---|---|---|---|---|---|
| 38 | 1.2 | 12 | 0.5 | 15 | B | B |
| | | | 0.5 | 30 | B | B |
| | | | 5.2 | 15 | B | B |
| | | | 5.2 | 30 | A | B |
| 38 | 1.7 | 12 | 0.2 | 10 | C | A |
| | | | 0.2 | 30 | C | A |
| | | | 0.5 | 10 | C | B |
| | | | 0.5 | 15 | B | B |
| | | | 0.5 | 30 | A | B |
| | | | 0.5 | 50 | A | C |
| | | | 5.2 | 5 | C | A |
| | | | 5.2 | 15 | A | B |
| | | | 5.2 | 30 | A | B |
| | | | 5.2 | 45 | A | C |
| | | | 6.7 | 15 | A | C |
| | | | 6.7 | 30 | A | C |
| 80 | 1.7 | 20 | 0.2 | 10 | C | A |
| | | | 0.2 | 30 | C | B |
| | | | 0.5 | 10 | C | B |
| | | | 0.5 | 15 | B | B |
| | | | 0.5 | 30 | A | B |
| | | | 0.5 | 50 | A | C |
| | | | 5.2 | 5 | C | B |
| | | | 5.2 | 15 | A | B |
| | | | 5.2 | 30 | A | B |
| | | | 5.2 | 45 | A | C |
| | | | 6.7 | 15 | A | C |
| | | | 6.7 | 30 | A | C |
| 75 | 1.7 | 25 | 5.2 | 15 | A | C |
| | | | 5.2 | 30 | A | C |
| 80 | 1.9 | 20 | 5.2 | 15 | A | C |
| | | | 5.2 | 30 | A | C |

FIG. 4 shows the relationship between the content of the glass grains in the crust layer and the penetration resistance of the foam glass with respect to the samples 50 mm in total thickness, 0.4 in bulk density of the foam layer, 1.0 in bulk density of the crust layer and 8 mm in the thickness of the crust layer. The curve (1) represents samples in which the grain size of the glass grains was 1 mm, and the curve (1.7) represents samples using 1.7 mm glass grains. It is seen that the penetration resistance sharply increases as the content of the glass grains increases up to about 15 vol % and then gently increases as the content of the glass grains further increases. Similar tendencies were observed also when glass grains of different sizes were used. Collectively, it is evidenced that when the crust layer contains at least 15 vol % of glass grains the penetration resistance R of the foam glass becomes 120 kg/cm$^2$ or above, which means that the foam glass has excellent flaw resistance.

FIG. 5 shows the relationship between the grain size of the glass grains dispersed in the crust layer and the penetration resistance of the foam glass with respect to the samples 50 mm in total thickness, 0.4 in bulk density of the foam layer, and 8 mm in the thickness of the crust layer. The curve (1.0–20) represents samples in which the crust layer had a bulk density of 1.0 and contained 20 vol % of glass grains. The curve (1.0–30) represents samples in which the crust layer had a bulk density of 1.0 and contained 30 vol % of glass grains. The curve (1.2–20) represents samples in which the crust layer had a bulk density of 1.2 and contained 20 vol % of glass grains. It is seen that the penetration resistance sharply increases as the grain size of the glass grains is increased up to about 0.5 mm and then gently increases as the grain size is further increased. Similar tendencies were observed also when the content of glass grains in the crust layer was further varied. Collectively, it is evidenced that the penetration resistance R of the foam glass becomes above 120 kg/cm$^2$ when glass grains not smaller than 0.5 mm are dispersed in the crust layer.

FIG. 6 shows the relationship between the thickness of the crust layer and the penetration resistance of the foam glass with respect to the samples 50 mm in total thickness, 0.4 in bulk density of the foam layer, 1.0 in bulk density of the crust layer and 20 vol % in the content of glass grains in the crust layer. The curve (1) represents samples using 1 mm glass grains and the curve (1.7) samples using 1.7 mm glass grains. It is seen that the penetration resistance increases nearly proportionally to the thickness of the crust layer.

In Tables 3-A and 3-B it is seen that the penetration resistance of the foam glass becomes sufficiently high when the crust layer has a bulk density in the range from 0.8 to 1.7 and a thickness in the range from 2 to 20 mm and contains at least 15 vol % of glass grains not smaller than 0.5 mm in grain size. Although the cuttability of the foam glass gradually declines as the content of glass grains in the crust layer increases and as the grain size of the glass grains becomes larger, it is apparent that good cuttability is retained so far as the glass grains in the crust layer of an appropriate bulk density and an approprite thickness are not more than 30 vol % of the whole crust layer and not larger than 5.2 mm in grain size.

As mentioned hereinbefore, a reinforced foam glass according to the invention is obtained by embedding a reinforcing metal material such as metal wires, metal wire netting or panting metal in the foam layer or the crust layer or at the interface between the two layers. If desired the metal material may be embedded in both the foam layer and the crust layer. It is also optional to use two or more kinds of metal materials in combination. Such reinforcement affords the foam glass with fire resistance besides enhanced mechanical strength. Accordingly the reinforced foam glass is of use not only as a wall material but also as a floor material.

Reinforcing a foam glass with a metal material is a well known matter. However, also it is known that in practice the embedded metal material does not fully exhibit its reinforcing effect by reason of its insufficient adhesion to the glass matrix. The insufficient adhesion is attributed mainly to a difference in the degree of shrinkage between the glass and the metal material at the stage of cooling the fired foam glass material, to rather inferior wettability of the metal material with the melted glass and to oxidation of the metal material by the action of the gases generated in the foaming process. Concerning a conventional reinforced foam glass, JP-A No. 51-77610 proposes to coat a reinforcing metal wire netting with water glass to thereby prevent oxidation of the wire netting and improve adhesion of the netting with the glass. However, a disadvantage of this method is that vaporization of water contained in the water glass during the glass firing process is liable to cause rusting of the wire netting and formation of voids around the wire netting so that adhesion of the wire netting to the glass matrix remains insufficient. JP-A No. 50-26145, which relates to a sound insulating porous board produced by pressure sintering of a mixture of ceramics particles and glass frit particles with a metal wire netting embedded therein, proposes to coat the wire netting with the frit in advance by using an aqueous slurry of the frit. However, the frit applied in the form of such a slurry does not very strongly adhere to the wire netting and, therefore, is liable to separate from the wire netting at the stage of pouring a foam glass material into a molding box in which the wire netting is disposed or embedding the wire netting in a layered accumulation of the foam glass material.

In a reinforced foam glass according to the invention, it is preferred to coat the reinforcing metal material with a gluing agent comprising a powder of a silica based glass or a source material of a silica based glass.

A preferred embodiment of the gluing agent is a mixture of a fine powder of a silica based glass such as soda lime silicate glass, alkali borosilicate glass or lead silicate glass and an adhesive binder such as water glass or a thermoplastic resin. As the thermoplastic resin a phenolic resin is preferred though different resins such as polyvinyl acetate, polyvinyl alcohol and polyvinyl butyral are also of use. To achieve very good adhesion of the coated metal material to the foam glass matrix it is desirable to use in the gluing agent a silica based glass whose softening temperature is in the range from 750° to 1000° C. This gluing agent is applied to the metal material by a usual method such as spraying, immersion or brushing.

When the binder is water glass it is suitable to use an about 40 wt % aqueous solution of sodium silicate. In this case it is suitable that the content of the silica based glass powder in the gluing agent is 30–50 wt %. If the content of the glass powder is less than 30 wt % the existence of excessive water glass may cause development of voids around the metal material attributed to the foaming action of water glass or oxidation of the metal material due to combined action of water and heat. When the content of the glass powder is more than 50 wt % the coating operation encounters difficulty and is liable to result in incomplete or insufficient coating. In the foam glass firing process the sodium silicate in the gluing agent first melts and fills up the interstices between the silica based glass powder paricles and then reacts with the silica based glass powder with the effect of reducing the softening and melting temperatures of the glass powder. Consequently the silica based glass powder melts well and exhibits enhanced fluidity and firmly adheres to the foam glass matrix.

When the binder is a thermoplastic resin it is suitable to use a 20–30 wt % solution of the resin in an ordinary solvent. The silica based glass powder is mixed with this solution so as to occupy 30–60 wt % of the resultant mixture. If the amount of the resin is too large the gas generating decomposition of the resin at the foam glass firing process will become a cause of formation of voids around the metal material. If the amount of the resin is too small, coating of the metal material with the gluing agent will encounter difficulty and will fail in providing a firm and healthy coating layer. During the firing process a portion of the thermoplastic resin will fluidify and gradually dissipate in gaseous form while another portion of the resin will undergo curing to the extent of cracking or peeling from the metal material and will finally decompose and dissipate. Anyhow, good adhesion of the metal material to the foam glass matrix is attained by using a suitable amount of a thermoplastic resin, preferably an acrylic resin, together with a silica based glass powder.

Also it is possible to use practically pure silica or a compound oxide containing silica, such as $SiO_2.ZrO_2$, $SiO_2.Al_2O_3$ or $SiO_2.TiO_2$, in place of an ordinary silica based glass. However, it is unsuitable to use a powder of silica or such a compound oxide in the gluing material for application to the reinforcing metal material since either silica or the compound oxide is high in melting point. Instead, it is suitable to use a silicon alkoxide $Si(OR)_4$ (R is an alkyl group) either singly or together with an alkoxide of another metal, e.g. $Al(OR)_3$ or $Zr(OR)_4$, in the form of a sol or dispersion in a suitable liquid medium such as alcohol. A suitable concentration of the alkoxide(s) in the dispersion is 35–65 wt %. If the content of the alkoxide(s) is too high, application of the sol to the reinforcing metal material becomes difficult because of gelation of the sol due to hydrolysis of the alkoxide(s). When such a sol is applied to the metal material as a gluing agent, followed by evaporation of the alcohl, firing of the foam glass materials including the coated metal material converts the alkoxide(s) on the metal material surface into a glass or glass-ceramic coating which has a dense structure and good heat resistance and is strongly adherent to the foam glass matrix.

Whether the principal material of the gluing agent is a silica based glass powder or a silicon alkoxide, the thickness of the coating layer on the reinforcing metal material needs to be at least 10 μm for a success in completely covering the metal material and strongly bonding the metal material to the foam glass matrix. However, the effect of the coating does not significantly augment when the thickness of the coating is increased beyond 1 mm.

A reinforced foam glass produced by using a metal material coated in accordance with the present invention is higher in mechanical strength and far better in fire resistance than another reinforced foam glass using the same metal material without the coating treatment.

EXPERIMENT

A number of samples of a foam glass having a single crust layer according to the invention were produced by using granulated materials, which were prepared generally in accordance with Example 1, and by performing firing of the materials in a molding box at 750° C. for 30 min. Every sample was 6 cm × 16 cm in widths and 80 mm in thickness. In every sample the foam layer had bulk density of 0.5 and a thickness of 60 mm, and the crust layer had a bulk density of 1.0 and a thickness of 20 mm.

In the molding box the granulated material of the crust layer was layered on a bed of the granulated material of the foam layer. Before starting the firing operation, a steel rod having a diameter of 3 mm and a length of 190 mm was vertically inserted into the layered granulated materials and held in such a position that the inserted end of the rod was at a depth of 15 mm from the surface of the crust layer in the obtained foam glass (meaning that the end of the rod was within the crust layer) in some samples, and at a depth of 40 mm from the surface of the crust layer (meaning that the end of the rod intruded into the foam layer) in other samples. In advance, the steel rod was coated with a gluing agent which was widely variable as shown in Tables 4-A, and 4-B and 4-C.

For every sample foam glass the adhesion strength of the steel rod was measured with a tensile tester by pulling out the rod at a rate of 2 mm/min. Besides, the samples were broken in the region containing the steel rod to examine whether voids were present around the steel rod or not. The results are shown in Tables 4-A, 4-B and 4-C. In the Tables the adhesion strength of the steel rod, $\sigma$, is evaluated in three stages. The grade A means "excellent" ($\sigma > 10$ kg/cm$^2$). The grade B means "good" ($7$ kg/cm$^2 < \sigma \leq 10$ kg/cm$^2$). The grade C means "inferior" ($\sigma \leq 7$ kg/cm$^2$). The presence or absence of voids is evaluated in three stages. The grade A means "very satisfactory" (few voids). The grade B means "satisfactory" (some voids). The grade C means "unsatisfactory" (considerable voids).

TABLE 4-A

| Treatment of Steel Rod | | | | | | |
|---|---|---|---|---|---|---|
| Type of Glass Powder (softening point °C.) | Binder | Solid Matter Concentration (wt %) | Position of Steel Rod End | Adhesion Strength | Voids | Note |
| no treatment | | | foam layer | C | C | |
| — | water glass | | " | C | C | |
| alkali borosilicate (540) | water (some kaolin) | 40 | " | C | C | bad gluing |
| soda lime (720) | water glass | 25 | " | C | C | |
| | | 30 | " | B | B | |

TABLE 4-A-continued

| Type of Glass Powder (softening point °C.) | Binder | Solid Matter Concentration (wt %) | Position of Steel Rod End | Adhesion Strength | Voids | Note |
|---|---|---|---|---|---|---|
| | | 40 | " | A | A | |
| | | 50 | " | A | A | |
| | | 60 | " | C | C | bad gluing |
| | | 30 | crust layer | A | A | |
| | | 50 | " | A | A | |
| high silica borosilicate (820) | water glass | 30 | foam layer | C | B | bad sintering |
| | | 50 | " | C | B | " |
| alkali borosilicate (540) | water glass | 25 | " | B | C | |
| | | 30 | " | A | A | |
| | | 50 | " | A | A | |
| | | 60 | " | C | C | bad gluing |

TABLE 4-B

| Type of Glass Powder (softening point °C.) | Binder | Solid Matter Concentration (wt %) | Position of Steel Rod End | Adhesion Strength | Voids | Note |
|---|---|---|---|---|---|---|
| soda lime (720) | acrylic resin | 25 | foam layer | C | B | |
| | | 30 | " | A | A | |
| | | 50 | " | A | A | |
| | | 60 | " | A | A | |
| | | 70 | " | C | C | bad gluing |
| high silica borosilicate (820) | acrylic resin | 30 | " | C | B | bad sintering |
| | | 60 | " | C | B | " |
| alkali borosilicate (540) | acrylic resin | 25 | " | B | C | |
| | | 30 | " | A | A | |
| | | 50 | " | A | A | |
| | | 60 | " | A | A | |
| | | 70 | " | C | C | bad gluing |
| soda lime (720) | polyvinyl acetate | 30 | " | B | B | |
| | | 60 | " | B | B | |

TABLE 4-C

| Alkoxide (formed oxide) | Dispersion Medium | Solid Matter Concentration (wt %) | Position of Steel Rod End | Adhesion Strength | Voids | Note |
|---|---|---|---|---|---|---|
| Si—isopropoxide (SiO$_2$) | isopropyl alcohol | 30 | foam layer | C | B | |
| | | 35 | " | A | A | |
| | | 65 | " | A | A | |
| | | 70 | " | C | C | bad gluing |
| | | 35 | crust layer | A | A | |
| | | 65 | " | A | A | |
| Si—ethoxide and Al—ethoxide (SiO$_2$.Al$_2$O$_3$) | ethyl alcohol | 30 | foam layer | C | B | |
| | | 35 | " | A | A | |
| | | 65 | " | A | A | |
| Si—isopropoxide and Zr—isopropoxide (SiO$_2$.ZrO$_2$) | isopropyl alcohol | 35 | " | A | A | |
| | | 65 | " | A | A | |
| | | 70 | " | C | C | bad coating |

EXAMPLE 3

An unreinforced foam glass having a single crust layer according to the invention was produced generally in the same manner as in Example 1. In addition, ten kinds of reinforced foam glass samples were produced by embedding a steel wire netting in the foam layer of the firstly mentioned foam glass. As shown in Table 5, the wire netting was variously treated in advance. In every foam glass produced in this example the foam layer had a bulk density of 0.4 and a thickness of 42 mm, and the crust layer had a bulk density of 1.0 and a thickness of 8 mm. The wire netting was formed of steel wire having a diameter of 3 mm, and the openings of the netting were 50 mm × 50 mm. In every reinforced foam glass, the wire netting was located in the middle of the whole thickness of the foam glass.

Every foam glass produced in this example was subjected to an impact resistance test using test pieces 20 cm in width, 28 cm in length and 50 mm in thickness.

On a sand bed each test piece was laid its crust layer upside, and a steel ball weighing 1 kg was dropped onto the test piece from a variable height to find break strength of the test piece. The results are shown in Table 5. It is apparent that the impact resistance of the reinforced foam glass was considerably enhanced by pretreating the wire netting with a gluing agent preferred in this invention.

TABLE 5

| Sample No. | Gluing Agent Applied to Wire Netting | Impact Resistance (kg m) |
|---|---|---|
| 1 | not included wire netting | 1.3 |
| 2 | no treatment | 1.9 |
| 3 | soda lime glass powder and water (a little clay added) | 2.2 |
| 4 | alkali borosilicate glass frit and water glass (solid: 25 wt %) | 2.4 |
| 5 | soda lime glass powder and acrylic resin solution (solid: 25 wt %) | 2.3 |
| 6 | soda lime glass powder and water glass (solid: 50 wt %) | 2.8 |
| 7 | alkali borosilicate glass frit and water glass (solid: 50 wt %) | 3.2 |
| 8 | soda lime glass powder and acrylic resin solution (solid: 60 wt %) | 2.9 |
| 9 | alkali borosilicate glass frit and acrylic resin solution (solid: 60 wt %) | 3.1 |
| 10 | Si—isopropoxide + Zr—isopropoxide and isopropyl alcohol (solid: 65 wt %) | 3.0 |
| 11 | Si—ethoxide + Al—ethoxie and ethyl alcohol (solid: 65 wt %) | 2.8 |

EXAMPLE 4

Ten kinds of foam glass samples wer produced by embedding a steel wire netting in the foam layer of the foam glass described in Example 3. As shown in Table 6, the wire nettig was variously treated in advance. The wire netting was formed of a thin steel wire having a diamter of 0.5 mm, and the openings of the netting were 10 mm×10 mm. In every reinforced glass sample, the wire netting was located at a depth of 10 mm from the outer surface of the crust layer, i.e. in the foam layer at a depth of about 2 mm from the interface between the foam and crust layers.

Every foam glass produced in this example was subjected to a fire resistance test which was generally in accordance with JIS A 1304. Test pieces of the foam glasses were 20 cm×20 cm in widths and 50 mm in thickness. Each test piece was heated at 1010° C. for 2 hr with a flame from the crusted side, and the maximum temperature on the back surface (not facing the flame) was measured. A criterion for evaluation of the fire resistance of reinforced foam glass as a wall material is that the temperature on the back surface does not exceed 260° C. Besides, appearance of the tested samples were carefully observed. The results are shown in Table 6. It is understood that the pretreatment of the wire netting with a gluing agent preferred in this invention is very effective in improving fire resistance of the reinforced foam glass.

TABLE 6

| Sample No. | Gluing Agent Applied to Wire Netting | Fire Resistance Test Result Appearance | Max. Temp. on Back Surface (°C.) |
|---|---|---|---|
| 1 | not included wire netting | broke into several pieces: serious defor- mention | impossible to measure: flame penetrated to reach back surface |
| 20 | no treatment | many cracks reached back surface: locally broke: some deformation | 198 |
| 21 | water glass | many cracks reached back surface: locally broke: some deformation | 169 |
| 22 | soda lime glass powder and water glass (solid: 20 wt %) | many cracks reached back surface: a little deformation | 164 |
| 23 | alkali borosilicate glass frit and acrylic resin solution (solid: 20 wt %) | many cracks reached back surface: a little deformation | 157 |
| 24 | soda lime glass powder and water glass (solid: 50 wt %) | minute cracks on back surface: no deformation | 143 |
| 25 | alkali borosilicate glass frit and water glass (solid: 40 wt %) | minute cracks on back surface: no deformation | 161 |
| 26 | Si—ethoxide and ethyl alcohol (solid: 50 wt %) | minute cracks on back surface: no deformation | 155 |
| 27 | Si—ethoxide + Ti— ethoxide and ethyl alcohol (solid: 40 wt %) | minute cracks on back surface: no deformation | 149 |
| 28 | soda lime glass powder and acrylic resin solution (solid: 40 wt %) | minute cracks on back surface: no deformation | 159 |
| 29 | alkali borosilicate glass frit and acrylic resin solution (solid: 50 wt %) | minute cracks on back surface: no deformation | 148 |

What is claimed is:

1. A foam glass comprising a foam layer consisting essentially of a glass selected from the group consisting of soda lime glass, borosilicate glass and aluminosilicate glass, and a crust layer which is unitary with the foam layer and covers at least one major surface of the foam layer, the crust layer consisting essentially of a glass selected from the group consisting of soda lime glass, borosilicate glass and aluminosilicate glass, and having an apparent specific gravity in the range from 0.8 to 1.7 and a thickness in the range from 1.5 to 20 mm, the the thickness of the crust layer being not more than ¼ of the whole thickness of the foam glass, wherein the difference between the apparent specific gravity of the foam layer is not more than 1.2.

2. A foam glass according to claim 1, wherein the foam layer has an apparent specific gravity in the range from 0.3 from 0.6.

3. A foam glass according to claim 1, wherein the thickness of the crust layer is in the range from 2 to 9 mm.

4. A foam glass according to claim 1, wherein the total thickness of the foam layer and the crust layer is in the range from 30 to 125 mm.

5. A foam glass according to claim 1, wherein at least one of the foam layer and the crust layer has recessed areas and relatively projecting areas on an outer major surface thereof.

6. A foam glass according to claim 1, where,in the crust layer comprises a vitreous matrix and glass grains dispersed in said matrix, the glass grains being in the range from 0.5 to 5.2 mm in grain size and amounting to 15–30 vol % of the crust layer.

7. A foam glass according to claim 6, wherein said glass grains are substantially uniform in grain size.

8. A foam glass according to claim 6, wherein said glass grains are nonuniform in grain size.

9. A foam glass according to claim 6, wherein said glass grains are colored glass grains.

10. A foam glass comprising a foam layer consisting essentially of a glass selected from the group consisting of soda lime glass, borosilicate glass and aluminosilicate glass, and a crust layer which is unitary with the foam layer and a covers at least one major surface of the foam layer, the crust layer consisting essentially of a glass selected from the group consisting of soda lime glass, borosilicate glass and aluminosilicate glass, and having an apparent specific gravity in the range from 0.8 to 1.7 and a thickness in the range from 1.5 to 20 mm, the thickness of the crust layer being not more than ¼ of the whole thickness of the foam glass, wherein the difference between the apparent specific gravity of the crust layer and an apparent specific gravity of the foam layer is not more than 1.2, and further comprising a reinforcing metal material disposed in at least one of the foam layer and the crust layer, said metal material being coated with a silica based vitreous material comprising a silica based glass which is applied in powder form to said metal material and fused together with glass materials of the foam glass.

11. A foam glass according to claim 10, wherein said metal material comprises wires.

12. A foam glass according to claim 10, wherein said metal material comprises a wire netting.

13. A form glass according to claim 10, wherein said silica based vitreous material further comprises water glass.

14. A foam glass comprising a foam layer consisting essentially of a glass selected from the group consisting of soda lime glass, borosilicate glass and aluminosilicate glass, and a crust layer which is unitary with the foam layer and covers at least one major surface of the foam layer, the crust layer consisting essentially of a glass selected from the group consisting of soda lime glass, borosilicate glass and aluminosilicate glass, and having an apparent specific gravity in the range from 0.8 to 1.7 and a thickness in the range from 1.5 to 20 mm, the thickness of the crust layer being not more than ¼ of the whole thickness of the foam glass, wherein the difference between the apparent specific gravity of the crust layer and an apparent specific gravity of the foam layer is not more than 1.2, and further comprising a reinforcing metal material disposed in at least one of the foam layer and the crust layer, said metal material being coated with a silica based viteous material comprising silica glass formed by pyrolysis of a silicon alkoxyide on the surface of said metal material.

15. A foam glass comprising a faom layer consisting essentially of a glass selected from the group consisting of soda lime glass, borosilicate glass and aluminosilicate glass, and a crust layer which is unitary with the foam layer and covers at least one major surface of the foam layer, the crust layer consisting essentially of a glass selected from the group consisting of soda lime glass, borosilicate glass and aluminosilicate glass, and having an apparent specific gravity in the range from 0.8 to 1.7 and a thickness in the range from 1.5 to 20 mm, the thickness of the crust layer being not more than ¼ of the whole thickness of the foam glass, wherein the difference between the apparent specfic gravity of the crust layer and an apparent specific gravity of the foam layer is not more than 1.2, and further comprising a reinforcing metal material disposed in at least one of the foam layer and the curst layer said metal material being coated with a silica based vitreous material comprising a compound oxide which contains silica and is formed by pyrolysis of a mixture of a silicon alkoxide and at least one other metal alkoxide.

16. A foam glass according to claim 15, wherein said at least one other metal alkoxide is selected from the group consisting of aluminum alkoxides, zirconium alkxoides and titanium alkoxides.

17. A foam glass according to claim 14, wherein said metal material comprises wires.

18. A foam glass according to claim 14, wherein said metal material comprises a wire netting.

19. A foam glass according to claim 15, wherein said metal material comprises wires.

20. A foam glass according to claim 15, wherein saids metal material comprises a wire netting.

* * * * *